United States Patent Office 3,312,645
Patented Apr. 4, 1967

3,312,645
OIL-MODIFIED POLYESTER REACTION PRODUCTS AND OIL-MODIFIED, PHENOL - ALDEHYDE RESIN MODIFIED REACTION PRODUCTS
Norman J. George and Alexander Kitun, St. Louis, Mo., assignors to P. D. George Company, St. Louis, Mo., a corporation of Delaware
No Drawing. Filed Apr. 10, 1964, Ser. No. 358,928
22 Claims. (Cl. 260—22)

In U.S. patent application S.N. 312,320, filed Sept. 30, 1963, now U.S. Patent No. 3,297,785, of which this application is a continuation-in-part, there are described certain polyester resins derived from polyfunctional derivatives of isocyanuric acid which contains a plurality of -alkyl-X groups, where X is —OH or

where R is H or an alcohol moiety; for example tris(2-hydroxyethyl) isocyanurate (THIC) and tris(2-carboxyethyl) isocyanurate and esters thereof; to electrical conductors coated therewith; and to other uses therefor.

The present invention relates to oil-modified polyesters derived from said isocyanuric acid derivatives which are prepared with fatty acids and/or oils, for example of long, medium, or short oil content; to uses therefor, including electrical conductors coated therewith; and more particularly to the use of said oil-modified polyesters as electrical insulating varnishes.

We have particularly found that said oil or fatty acid modified polyesters, particularly those containing certain resins, for example oil-soluble phenol-aldehyde resins, can be made into outstanding electrical insulating varnishes. In the preferred embodiments we have found that certain oil or fatty acid modified polyesters prepared from a polycarboxylic acid and an isocyanurate such as THIC, without the use of a glycol and/or polyol, and more particularly those which also contain oil soluble resins, such as phenol-aldehyde resins, can be used to prepare outstanding electrical insulating varnishes.

In general, the compositions of the present invention are prepared by employing a fatty acid or oil in conjunction with the teachings of S.N. 312,320 so as to produce the corresponding oil modified resins. The general process for preparing oil modified resins is so well known to the art that we shall not go into such preparation in great detail. Preparation can be effected by alcoholysis or acidolysis. The following description will summarize certain procedures which are employed.

The oil-modified polyesters of the present invention may be formed in any of the conventional ways. Thus, where glycols and polyols are employed, the resins may be prepared by a three-step process which comprises first forming a glycol-polycarboxylic acid polyester, such as a glycol-phthalate polyester, by heating ethylene glycol and a lower dialkyl ester of a phthalic acid or the corresponding acid. In the second step, fatty oil monoglycerides and/or isocyanaurates are prepared by heating the fatty oil with glycerin or THIC. In the third step, the glycol-phthalate polyester and the monoglycerides and/or isocyanurates are heated together to form the oil-modified polyester.

The oil-modified polyester may also be prepared by a two-step method in which the fatty oil monoglycerides and/or isocyanurates are formed as in the three-step method and these monoglycerides are then reacted with a glycol, such as ethylene glycol, and an alkyl ester or the corresponding acid, such as a lower dialkyl ester of a phthalic acid, to form the finished product.

In the one-step method of preparation the alkyl ester, such as the lower dialkyl ester of a phthalic acid or the corresponding acid, ethylene glycol, glycerin and/or THIC and the fatty acid or oil are all heated together to form the polyester.

In the preferred embodiment, no glycol or glycerin apart from that derived from the oil is employed and the polyester is prepared by heating a polycarboxylic acid, such as a phthalic acid, with tris(2-hydroxy ethyl) isocyanurate and the fatty acid or oil. Alternately THIC can be heated with fatty acid or oil prior to the addition of the polycarboxylic acid; or the polycarboxylic acid can be treated with THIC prior to the addition of the fatty acid or oil.

Representative fatty oils which may be used in the practice of the present invention are included the non-drying, semi-drying, and drying fatty oils, including vegetable oils and animal oils, marine oils and treated marine oils, such as soya, cottonseed, hydrogenated cottonseed, linseed, castor, hydrogenated castor, dehydrated castor, cocoanut, tung, oiticica, menhaden, hempseed, grapeseed, corn, cod-liver, candlenut, walnut, perilla, poppyseed, safflower, conjugated safflower, sunflower, rapeseed, China-wood, tristearin, whale, sardine, herring, etc. oils. Instead of using these oils, it should be understood that for the purposes of the present invention fatty acids or mixtures of fatty acids which make up the fatty oils or their equivalents can be employed.

Representative monocarboxylic acids including fatty acids may be illustrated by the following: abietic acid, benzoic acid, caproic acid, caprylic acid, castor fatty acid, coconut fatty acid, cottonseed fatty acid, crotonic acid, DCO FA, i.e. primarily $CH_3(CH_2)_5CH=CH—CH=CH—(CH_2)_7COOH$ 2-ethyl hexoic acid, lauric acid, linoleic acid, linolenic acid, linseed FA, oleic acid, pelargonic acid, rosin acid (A.N. 165), soya FA, tall oil FA (A.N. 195, A.N. 192), etc.

Percentage oil length normally refers to the oil portion of the resin expressed as a percentage of the total weight of the finished resin. It is equal to the weight of any fatty acid in the resin taken together with the weight of a polyol needed to completely esterify this fatty acid (minus weight of evolved water of esterification) expressed as a percentage of the total solids content of the finished resin.

Thus, where a fatty acid is present in the formulation, its oil length is calculated as a fully esterified ester of the polyol. For example, where THIC, a fatty acid, such as tall oil FA, and a polycarboxylic acid, such as a phthalic acid, are the sole reactants, the oil length of the formulation is as follows:

Percent oil length =

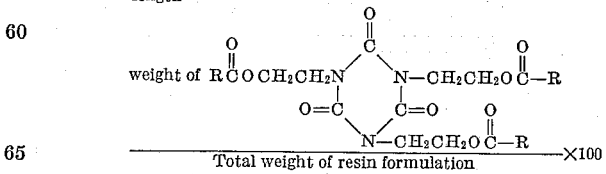

where R represents the tall oil FA moiety.

Where an oil is employed, the oil length is calculated as follows:

Percent oil length=
$$\frac{\text{Wt. fatty acid glyceride (or oil)} \times 100}{\text{Total resin weight}}$$

Where less than a full glyceride is employed, for example a mono- or a di-glyceride, the oil length is calculated as the full glyceride produced during esterification.

Thus, in the preferred embodiment where the sole reactants are THIC, a fatty acid, and a polycarboxylic acid (i.e. the formulation contains no glycol or glycerine), the oil length is calculated as the full ester of the fatty acid and THIC

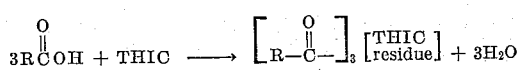

The remaining THIC in the formulation which is not part of the fatty acid ester is calculated as the polyester of THIC and the polycarboxylic acid.

Thus, for purposes of this invention an oil modified polyester includes polyesters modified with fatty acids as well as oils. The preferred embodiment of this invention is a polyester resin prepared from a fatty acid, i.e. a polyester containing no glycol or glycerine. The oil-modified polyesters may be of long, medium or short oil content, but is preferably of long oil content; where a fatty acid is employed, it may also be long, medium or short, i.e. having proportionate ranges of fatty acids calculated as glycerides and/or isocyanurates as compared to the oils. These terms have the following meanings: Short oil 30–45%; medium oil 45–55%; long oil 55–75%, weight of oil based on total weight of the polyester formulation including the oil. Lesser amounts of oil such as 25% or lower, or greater amounts of oil, such as 75–80% or greater, may also be employed in certain instances.

The following examples are presented by way of illustration and not of limitation.

As stated therein, the polyesters of S.N. 312,320 can be prepared as oil modified resins. For example, by the addition of fatty acids and oils, the composition described in S.N. 312,320 can be converted to polyester resins of short, medium or long oil length. Thus, the compositions described in Table I of S.N. 312,320 can, by any of the methods described herein, be modified to prepare the compositions of the present invention. All of the compositions of Table I when prepared according to these modifications can yield oil modified resins which can be formulated in insulating varnishes.

The preferred polycarboxide acids employed in this invention are isophthalic and terephthalic acids or their equivalents. These polycarboxylic acids may be used alone or in conjunction with other polycarboxylic acids.

*Example 1*

This example describes the preparation of an oil-modified polyester resin by the three-step method from the ingredients shown in Example 15 of S.N. 312,320, employing soya oil. Its oil length is 33%.

|  | Wgt. | Moles |
|---|---|---|
| Dimethyl terephthalate | 582 | 3.0 |
| Ethylene glycol | 118 | 1.9 |
| THIC | 353 | 1.35 |
| Soya Oil | 300 | 0.3 |

The soya oil and the THIC are heated together with stirring to about 445° to 465° F. under a carbon dioxide blanket for one-half hour in the presence of 0.3 percent, by weight, of litharge based on the weight of the oil. This results in a mixture of monoglycerides and/or isocyanurates of the acids present in the soya oil.

A glycol-terephthalate polymer is formed by adding the dimethyl terephthalate and the ethylene glycol with 0.2 gram of magnesium oxide to a one liter, three-necked, ground glass jointed flask equipped with a carbon dioxide tube and a thermometer glycerol-sealed stirrer in the center neck, and a Dean-Stark trap in the third neck. On top of the trap is a reflux condenser to return the distillate to the trap. A slow stream of carbon dioxide is bubbled through the reaction mixture while the reactants are rapidly brought to 285° F. The reactants are then heated for about 5½ hours from 285° F. to about 545° F. to form the glycol-terephthalate polymer. The oil-modified polyester resin is then prepared by reacting together the soya monoglycerides and/or isocyanurates and the glycol terephthalate polymer at 572° F. for one hour.

*Example 2*

This example describes the preparation of an oil-modified polyester resin by the two-step method. In this case the reactants used are the same as in Example 1. Soya monoglycerides and/or isocyanurates are formed by reacting the soya oil and THIC by the method of Example 1 and the resulting monoglycerides and/or isocyanurates, the dimethyl terephthalate and the ethylene glycol are added to a glass reaction vessel and are heated with stirring under a carbon dioxide stream from room temperature up to a final temperature of about 555° F. in about 7 hours.

*Example 3*

This example shows the preparation of an oil-modified polyester resin by the one-step method. The reactants employed in this example are the same as those employed in Example 1. All of these ingredients are added to a reaction vessel together with 0.4 gram of litharge and the reaction mixture is heated with stirring with carbon dioxide bubbling through the reactants from room temperature up to a final temperature of about 545° F. in about 7 hours.

The other polyesters described in Table I of S.N. 312,320 are similarly reacted by one of the processes described herein to form an oil-modified polyester resin in accord with this invention.

In a preferred embodiment of this invention (except for THIC) no glycol or polyol, such as glycerine, apart from that derived from the oil, is employed in the preparation of the oil-modified polyesters of this invention. In the most preferred embodiment a fatty acid rather than an oil is employed so that no glycol or glycerine is present in the formulation. In general, the oil or fatty acid, THIC, and the polycarboxylic acid are reacted to form the product of this invention. This reaction can be carried out by alcoholysis or acidolysis. In acidolysis, the oil and polycarboxylic acids are reacted for a time and at a temperature sufficient to cause acidolysis, for example at about 525° F. for about one hour. Then THIC is added to this product which is heated until the desired acid number and the desired viscosity are obtained, for example over a period of 1–2 hours at 525° F.

In alcoholysis, the oil and THIC are reacted for a time and at a temperature sufficient to cause alcoholysis so as to form a soluble product which is predominantly the monoester (on the average) of the polyol (i.e. a monoester of glycerine and/or THIC). Thereupon, the remainder of the THIC and the polycarboxylic acid are added and heated at a suitable temperature until the desired acid number and viscosity are obtained.

*Example 4*

This example illustrates the preparation of a polyester from a fatty acid, THIC, and a polycarboxylic acid. The product which has an oil length of 63% calculated as the triester of THIC and tall oil FA contains neither glycol nor glycerine.

| Reactants | M.W. | E.W. | Parts by Weight Employed |
|---|---|---|---|
| THIC | 261 | 87 | 376 |
| Tall Oil | 285 | 285 | 507 |
| Isophthalic Acid | 166 | 83 | 191 |

Tall oil and THIC are heated together with stirring to about 480° F. for about one hour in a 5 liter, 3 necked flask fitted with a thermometer, stirrer, distillation column, Dean and Stark trap and an addition funnel. A carbon dioxide blanket is maintained on the system. Thereupon the isophthalic acid is gradually added over a period of about 45 minutes. The temperature of the reaction is maintained at about 490–500° F. until an acid number of less than 10 and a Gardner-Holdt viscosity of P–R is obtained in 50% mineral spirits.

*Example 5*

This example illustrates the preparation of a polyester from an oil, a polycarboxylic acid, and THIC. The product, which as an oil length of 61.6%, contains no glycol and the glycerine in the formulation is derived solely from the oil. Preparation is effected by acidolysis.

| Reactants | M.W. | E.W. | Parts by Weight Employed |
|---|---|---|---|
| THIC | 261 | 87 | 227 |
| Isophthalic Acid | 166 | 83 | 185 |
| Fumaric Acid | 116 | 58 | 125 |
| Soya Oil | 878 | 293 | 616 |

To a reaction vessel similar to that employed in Example 4 are added soya oil, isophthalic acid and fumaric acid which are reacted at a temperature of 525° F. for about one hour. Thereupon THIC is slowly added over a period of about 1.5 hours while the reaction is maintained at 525° F. where the temperature is maintained until an acid number of less than 15 and a Gardner-Holdt viscosity of O in 50% mineral spirits is obtained.

*Example 6*

This example illustrates the preparation of a polyester similar to that of Example 5 employing alcoholysis instead of acidolysis. Soya oil and sufficient THIC are added to the reaction vessel to form a mono-fatty acid ester of the (glycerin-THIC) triol.

This charge is heated at about 450° F. over a period of two hours employing PbO (0.1% based on total charge) as a catalyst until a product equivalent to the monoester is obtained. Thereupon the remainder of the THIC and the isophthalic and fumaric acid are added and heated at about 480° F. for about six hours until an acid number of less than 15 and a Gardner-Holdt viscosity of L (50% mineral spirits) are obtained.

*Example 7*

This example illustrates the present invention having an oil length of 70% which is prepared from a fatty acid calculated as the triester of THIC, THIC, and a tricarboxylic acid, i.e. trimellitic anhydride.

| Reactants | M.W. | E.W. | Parts by Weight Employed |
|---|---|---|---|
| Tall Oil FA | 285 | 285 | 563 |
| THIC | 261 | 87 | 375 |
| Trimellitic Anhydride | 192 | 64 | 119 |

Tall oil and THIC are heated at 480° F. for about one hour in an apparatus similar to that employed in Example 4. Thereupon trimellitic acid is gradually added over a period of about 45 minutes. The reaction mixture is maintained at about 500° F. until an acid number of less than 10 and a Gardner-Holdt viscosity of F–G (50% solids in mineral oil) is obtained.

*Example 8*

This example illustrates the present invention having a short oil content of 35.5% (calculated as the triester of THIC) employing total fusion.

| Reactants | M.W. | E.W. | Parts by Weight Employed |
|---|---|---|---|
| Tall oil FA | 285 | 285 | 285 |
| Isophthalic acid | 166 | 83 | 294 |
| THIC | 261 | 87 | 506 |

The reaction is carried out in a vessel similar to that employed in Example 4. In this example all reactants are charged into the vessel at once and this mixture is heated to 450–480° F. and maintained at this temperature until an acid number of less than 30 and a Gardner-Holdt viscosity of R (40% solids in xylol) are obtained.

As previously mentioned herein, the preferred embodiment of this invention relates to polyesters derived from fatty acids and/or oils, polycarboxylic acids and THIC, without the use of any additional glycol or polyol. The most preferred embodiment of this invention relates to polyesters derived from fatty acids, polycarboxylic acids and THIC, i.e. a polyester where the only hydroxy-containing compound is THIC without the presence of any glycol, glycerine, or any other polyol.

The proportions of reactants can vary widely to form polyesters of short, medium, and long oil content. The following is presented by way of illustration:

I. A short oil composition can be prepared from about 25–40 weight percent fatty acid, about 30–25 weight percent polycarboxylic acid and about 53–43 weight percent THIC; such as about 27–35 weight percent fatty acid, about 29–26 weight percent polycarboxylic acid and about 50–44 weight percent THIC; but preferably about 28–30 weight percent fatty acid, about 28–30 weight percent polycarboxylic acid and about 49–51 weight percent THIC.

II. A medium oil composition can be prepared from about 40–50 weight percent fatty acid, about 25–20 weight percent polycarboxylic acid and about 43–38 weight percent THIC; such as about 43–48 weight percent fatty acid, about 24–22 weight percent polycarboxylic acid, and about 41–39 weight percent THIC; but preferably about 44–46 weight percent fatty acid, about 21–23 weight percent polycarboxylic acid, and about 43–41 weight percent THIC.

III. Long oil composition can be prepared from about 50–70 weight percent fatty acid, about 20–10 weight percent polycarboxylic acid and about 38–26 weight percent THIC; such as about 50–55 weight percent fatty acid, about 19–16 weight percent polycarboxylic acid, and about 38–37 weight percent THIC; but preferably about 50–52 weight percent fatty acid, about 19–21 weight percent polycarboxylic acid and 37–39 weight percent THIC.

The above illustrates polyesters prepared from fatty acids. The following illustrates compositions prepared from fatty oils (i.e. glycerides) as contrasted to fatty acids.

I. A short oil composition can be prepared from about 30–45 weight percent oil, about 40–32 weight percent polycarboxylic acid and about 35–28 weight percent THIC; such as about 35–40 weight percent oil, about 37–34 weight percent polycarboxylic acid and about 33–31 weight perecnt THIC; but preferably about 41–43 weight percent oil, about 31–29 weight percent polycarboxylic acid and about 32–30 weight percent THIC.

II. A medium oil composition can be prepared from about 45–55 weight percent oil, about 32–27 weight percent polycarboxylic acid and about 28–18 weight percent THIC; such as about 47–52 weight percent oil, about 31–25 weight percent polycarboxylic acid and about 28–27 weight percent THIC; but preferably about 49–51 weight percent oil, about 27–29 weight percent polycarboxylic acid and about 28–26 weight percent THIC.

III. A long oil composition can be prepared from about 55–75 weight percent oil, about 27–10 weight percent polycarboxylic acid, and about 28–20 weight percent THIC; such as about 57–70 weight percent oil, about 25–12 weight percent polycarboxylic acid and about 23–22 weight percent THIC; but preferably about 61–64 weight percent oil, about 24–20 weight percent polycarboxylic acid and about 19–21 weight percent THIC.

The above weight percents are approximate based on materials charged and not on final compositions. It should be noted that their sum weight percent of material charged may be over 100% since during esterification water is removed. It should furthermore be realized that the optimum weight percent of each component will depend on the particular material employed in preparing the polyester.

The oil modified polyester resins of this invention can be further modified by employing various resins in conjunction therewith.

Included among such resins are phenol-aldehyde resins, phenol-sulfur resins, phenol-acetylene resins, including resins produced from phenol and substituted phenols, including difunctional, trifunctional and tetrafunctional phenols, naphthols, bisphenols, salicyclic acid and salicylates, etc., modified phenolic resins, including phenol-terpene resins, phenol-terpene-aldehyde resins, phenol-naphthalene-aldehyde resins, phenol-urea-formaldehyde resins, phenol-aniline-formaldehyde resins, phenol-glycerol resins, etc., non-phenolic resins having the necessary labile or reactive hydrogen including urea and substituted urea-aldehyde resins, sulfonamide-aldehyde resins, melamine-aldehyde resins, polycarboxy-polyamine resins, resins derived by ring hydrogenation of phenolic resins, and the like.

Suitable resins can be prepared from difunctional phenols and aldehydes. For the preparation of such resins, suitable phenols include: Para- and ortho-cresols; para- and ortho-ethyl-phenol; 3-methyl-4-ethyl-phenol; 3 - methyl - 4-propyl-phenol; 2-ethyl-3-methyl-phenol; 2-propyl-3-methyl-phenol; para- and ortho-propyl-phenol; para-tertiary-butyl-phenol; para-secondary-butylphenol; para-tertiary-amyl-phenol; para-secondary amyl-phenol; para-tertiary-hexyl-phenol; para-isooctyl-phenol; ortho-phenyl - phenol; para - phenyl - phenol; thymol; ortho-benzyl - phenol; para - benzyl-phenol; para-cyclohexyl-phenol; para-tertiary-decyl-phenol; para-dodecyl-phenol; para - tetradecyl - phenol; para-octadecyl-phenol; para-nonyl-phenol; para-methyl-phenol; para-eicosanyl-phenol; para-docosanyl-phenol; para-tetracosanyl-phenol; para-beta-naphthyl-phenol; para-alpha-naphthyl-phenol; para-pentadecyl-phenol; that of the formula

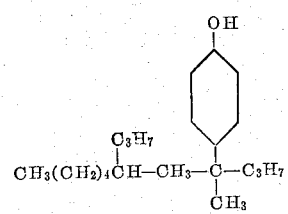

para-tertiary-alkyl-phenols of the formula

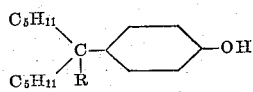

in which R is $C_9H_{19}$ to $C_{13}H_{27}$; para- and ortho-cetyl-phenols; para-cumyl-phenol; phenols of the formula

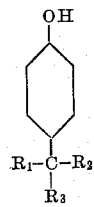

in which $R_1$ represents a straight chain hydrocarbon radical containing at least 7 carbon atoms and $R_2$ and $R_3$ represent hydrocarbon radicals the total number of carbon atoms attached to the tertiray carbon being at least 11; and phenols of the formula

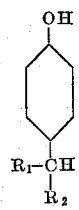

in which $R_1$ represents an alkyl hydrocarbon radical containing at least 7 carbon atoms in a straight chain and $R_2$ represents an alkyl hydrocarbon radical containing at least 2 carbon atoms, the total number of carbon atoms in $R_1$ and $R_2$ being at least 11; and the corresponding ortho-para substituted metal-cresols, and 3,5-xylenols; the alkyl salicylates, including methyl salicylate, butyl salicylate, amyl salicylate, octyl salicylate, nonyl salicylate, dodecyl salicylate; benzyl salicylate; cyclohexyl salicylate; oleyl salicylate; styryl salicylate; phenoxy ethyl salicylate; p-hydroxy-ethyl-benzoate; salicylic acid; p-chlorophenol; o-chlorophenol; o- and p-dimethylaminomethyl-phenol; p-pentenyl-phenol; guaiacol; catechol; p-phenoxyphenol; p-hydroxybenzophenone; hydroxyphenylheptadecyl ketone; hydroxyphenylheptadecenyl ketone; hydroxyphenylundecyl ketone; beta-naphthol; methyl naphthol; and carvacrol.

For the production of aldehyde-linked resins, including not only those derived from difunctional phenols, but also those derived from trifunctional and tetrafunctional phenols (e.g. bis-phenols) and modified phenolic resins involving aldehyde-derived bridges, any aldehyde capable of forming a methylol or a substituted methylol group and having not more than 8 carbon atoms is satisfactory, so long as it does not possess some other functional group or structure which will conflict with the resinification reaction but the use of formaldehyde, in its cheapest form of an aqueous solution, for the production of the resins is particularly advantageous.

Useful aldehydes, in addition to formaldehyde, are acetaldehyde, propionaldehyde, butyraldehyde, 2-ethylhexanal, ethylbutyraldehyde, heptaldehyde, and benzaldehyde, furfural and glyoxal.

The compositions of this invention can be employed to prepare insulating varnishes and in particular varnishes yielding electrical conductor coatings have improved properties. These varnishes are particularly valuable for impregnating armature and field coils of motors and for both power and distribution transformers of either the oil or dry type where long life at high operating temperatures is required. These varnishes provide maximum penetration in the tightest wound coils. They are particularly suitable for impregnating motor stators, rotors and other electrical equipment.

In preparing the insulating varnishes of the present invention, in addition to the oil modified polyester resins there is normally used an oil-soluble phenol-aldehyde resin. The phenol-aldehyde resin gives the varnish heat reactivity, improves electrical properties, aids in the cure and lends hardness and abrasion resistance to the product. Among the oil-soluble phenol-aldehyde resins which can be used are p-tertiary amylphenol-formaldehyde, p-tertiary butylphenol-formaldehyde, p-tertiary octylphenol-formaldehyde, p-phenylphenol-formaldehyde, 2,2-bias(p-hydroxyphenyl) propane-formaldehyde and o-tertiary butylphenol-formaldehyde. Other suitable phenol-formaldehyde resins are shown in Honel Patent 1,800,296. Substituted phenols alone or in conjunction with phenols can be used in forming the oil-soluble phenolic resin. While the phenolic resin can be prepared using an acid catalyst, they are generally prepared using alkaline catalysts as is well known in the art. Thus, the p-tertiary butylphenol-formaldehyde resin employed may be prepared by the alkaline (NaOH) catalyzed reaction of 1 mol of the phenol with 1.5 mols of formaldehyde. A typical example of a mixed phenolic resin which can be used is the alkaline (NaOH) catalyzed reaction product of 0.75 mol of p-tertiary butylphenol and 0.25 mol of bisphenol A with 1.5 mols of formaldehyde. The oil-soluble phenol-formaldehyde resins are of the heat-reactive type. The oil-soluble phenol-formaldehyde resin is usually employed in an amount of 10% to 80% by weight of the total of the oil modified polyester and phenolic resin, such as 15-40%, but preferably 20-30%. Increasing the amount of phenolic resin speeds the cure but also sacrifices ageing characteristics. Hence, the amount of phenolic resin is preferably kept at about 20% by weight. It is also possible to eliminate the phenolic resin from the varnish with resulting loss of the advantages from having the phenolic resin present. It is also possible to replace part of the phenolic resin with other heat-reactive resins, e.g., furane resins, triazine resins, urea-formaldehyde, melamine-formaldehyde and epoxy resins, e.g., bisphenol A-epichlorohydrin resin, although the preferred heat-reactive resins are the phenolic resin since they impart the best combination of improved properties, all things considered. Rosin-modified phenolics are also advantageously employed.

In addition to the resin components, the insulating varnish also includes one or more solvents, such as xylene, mineral spirits, isophorone, naphtha, toluene, etc.

The insulating varnishes of the instant invention have properties which warrant their use at class H temperatures. They can withstand temperatures in excess of 180° C. for the normal life of a motor or transformer in which they are utilized. The cured varnishes are highly resistant to oil, chemicals and moisture.

The varnishes in accelerated ageing tests have retained their toughness, flexibility, excellent bonding strength and high dielectric properties after heat ageing for as long as 20,000 hours at over 200° C., based on extrapolated values. The varnishes can be applied by vacuum impregnation or free dip system. They cure readily under infra red heat or in forced air ovens. Baking is normally done at 375° F. to 400° F., although lower temperatures can be used.

A typical insulating varnish is prepared by formulating the polyester of this invention with a phenolic resin, usually in a dilute solution for example from about 25-75% solids, but preferably as a 50% solution. Other conventional additives can be employed, for example a drier or curing agent may be employed, for example manganese, zinc, lead, titanium, cadmium, boron, thorium, etc. salts, such as the naphthenates, octoates, tolates, etc., thereof, for example in ratios of 1-10 parts or more of drier per 1000 parts by weight of polyester resin.

The following is a typical formulation:

Example 9

| | Parts by wt. |
|---|---|
| Polyester resin | 1000 |
| Phenolic resin | 183 |

The above is employed as a 50% solution containing the above solids.

Example 10

The phenolic resin employed in the examples is prepared in the conventional manner from the following:

| | Moles | Parts by Weight |
|---|---|---|
| p-Tertiary butyl phenol | 6.75 | 1,012.5 |
| Phenol | 2.00 | 188.0 |
| Paraformaldehyde | 1.625 | 488.0 |
| Water | | 650.0 |
| NaOH (50% aqueous solution) | | 124.0 |
| 30% HCl to neutralize after reaction | | 161.0 | p-Tertiary butyl phenol, phenol, paraformaldehyde, water and NaOH are heated to 212-220° F. and held for ½ hour. This product neutralized to a pH of 4.5-5.5 with the HCl is then dehydrated. It has a viscosity of T-V (Gardner-Holdt) as a 50% xylol solution.

The varnish is employed in the conventional manner. For example, a motor stator can be impregnated with the above formulation in a dip tank operation with a final cure being effected by baking in an oven for one hour at about 400° F.

The products of this invention can be employed as class H insulating varnishes, and they are compatible with all commercial wire enamels.

A typical commercial formulation prepared according to Example 9 employing the polyester of Example 4 has the following specifications:

| | |
|---|---|
| Color | B12-13. |
| Specific gravity | .934-.947. |
| Weight per gallon (77° F.) | 7.78-7.88. |
| Viscosity (Gardner-Holdt, —77° F.) | G-1. |
| Thinner | Xylol or V.M. & P. naphtha. |
| Corrosive effect on copper | None. |
| Solids | 49%-51%. |

Other viscosities @ 77° F.:
A. Brookfield #2 spindle _____ 200-300 cps.
B. #2 Zahn cup _____ 85-90 sec.
C. #1 Demmler cup _____ 85-95 sec.
D. #4 Ford cup _____ 70-80 sec.

The unusual properties of the varnishes of this invention are evident when the average life in hours, using the AIEE procedure #57 twisted pair test, is plotted against the reciprocal of the absolute temperature when wire coated and cured with the composition of Example 15 of S.N. 312,320 (which has an average extrapolated life of 20,000 hours at 200° C.) is further coated with the varnish of Example 9 employing the polyester of Example 4 of this patent application. The varnished, cured product has an extrapolated average life of 20,000 hours at 212° C. which exceeds the temperature requirement for a class H product, which is 180° C.

The outstanding high temperature performance of the compositions of this invention is clearly shown in the weight loss tests of Table I, where column 1 (referred to as Example 11) represents a varnish containing no isocyanurate polyester having been prepared from soya oil, isophthalic acid and glycerine with an oil length of about 63%. It was the best commercially available varnish containing no isocyanurate.

Column 2 in Table I represents the varnish of Example 9 employing the polyester of Example 5 of this application and column 3 represents the varnish of Example 9 employing the polyester of Example 4.

Weight losses of varnishes at high temperatures was determined by weighing 10 grs. of each varnish into weighed aluminum cups and baking at 325° F. (160° C.) for three hours. The baked product was then weighed. Two cups were aged at each of the following temperatures and the average values were recorded as indicated in the tabulation.

TABLE I.—WEIGHT LOSS VARNISHES IN PERCENT OF SOLIDS

|  | Column 1 | Column 2 | Column 3 |
|---|---|---|---|
| I. At 162° C. (325° F.), Hrs.: |  |  |  |
| 18 |  | 1.15 |  |
| 24 | 2.0 | 1.35 | 1.15 |
| 48 | 2.5 | 2.30 | 1.85 |
| 72 | 3.7 | 3.00 | 2.57 |
| 96 | 4.1 | 3.35 | 2.90 |
| 168 | 5.0 | 4.0 | 3.2 |
| II. At 180° C. (356° F.), Hrs.: |  |  |  |
| 8 | 1.8 |  |  |
| 12 | 2.4 | 1.25 | 0.8 |
| 18 | 3.3 | 1.55 | 0.9 |
| 24 | 3.75 | 2.05 | 1.2 |
| 48 | 4.35 | 3.5 | 3.0 |
| 72 | 4.9 | 4.2 | 3.5 |
| 96 | 5.2 | 4.5 | 3.9 |
| 168 | 5.4 | 5.2 | 4.6 |
| III. At 200° C. (392° F.), Hrs.: |  |  |  |
| 8 | 4.0 | 2.58 | 2.7 |
| 12 | 4.5 | 3.0 | 3.0 |
| 18 | 4.75 | 3.35 | 3.3 |
| 24 | 5.0 | 3.58 | 3.54 |
| 48 | 5.7 | 4.55 | 3.9 |
| 72 | 6.0 | 4.87 | 4.0 |
| 96 | 6.4 | 5.1 | 4.05 |
| 144 | 6.9 | 5.5 | 4.14 |
| 168 | 7.1 | 5.7 | 4.15 |
| IV. At 250° C. at (482° F.), Hrs.: |  |  |  |
| 3 | 6.9 | 4.4 | 3.4 |
| 6 | 6.9 | 5.0 | 4.4 |
| 24 | 9.6 | 5.6 | 5.2 |
| 48 | 10.0 | 6.4 | 5.63 |
| 68 |  |  | 5.79 |
| 92 |  |  | 5.97 |
| 158 |  |  | 6.34 |
| 168 |  |  | 6.4 |
| 181 |  |  | 6.56 |
| 205 |  |  | 6.65 |

The bonding strengths of the varnishes of this invention shown in the following Table II were determined by the Helical Coil Test by the Ford balance method. The actual bonding strengths are twice the recorded breaking load in pounds. Samples of the varnished Helical coils were aged at 250° C. and tested at room temperature and at 50° C. Two sets of samples were run for each test— two coats of varnish (I) over the wire enamel prepared according to Example 15 in S.N. 312,320 and (II) over bare aluminum wire, #18 size. The Helical Coil Test is the test devised by J. Dexter of Dow Corning.

TABLE II

| Varnish, Hours at 250° C. | Polyester of Ex. 4 in Varnish of Ex. 9 | | Polyester of Ex. 5 in Varnish of Ex. 9 | |
|---|---|---|---|---|
|  | Test at Rm. Temp., lbs. | Test 150° C., lbs. | Test at Rm. Temp., lbs. | Test 150° C., lbs. |
| (I) Over Wire Enamel Ex. 15: |  |  |  |  |
| 0 | 11.2 | 0.3 | 9.0 | 0.6 |
| 4 | 20.4 | 1.5 | 17.2 | 2.0 |
| 8 | 24.8 | 2.5 | 21.2 | 3.7 |
| 16 | 27.3 | 4.6 | 25.6 | 3.8 |
| 24 | 29.5 | 5.4 | 27.2 | 5.2 |
| 30 | 29.6 | 6.0 | 26.8 | 5.6 |
| 48 | 31.8 | 5.6 | 28.4 | 5.0 |
| 60 | 34.2 | 5.6 | 32.5 | 5.7 |
| 72 | 34.8 | 5.7 | 34.0 | 6.0 |
| 80 | 34.2 | 6.0 | 35.2 | 5.3 |
| 96 | 34.2 | 6.3 | 35.2 | 6.2 |
| 144 | 34.2 | 6.2 | 36.0 | 6.6 |
| 192 | 32.2 | 6.7 | 35.1 | 6.7 |
| 240 | 35.2 | 6.0 | 33.8 | 6.5 |
| 262 | 28.6 | 5.6 | 25.2 | 6.3 |
| 340 | 26.6 | 6.5 | 27.3 | 5.4 |
| 487 to 500 | 23.8 | 6.1 | 26.0 | 5.5 |
| 555 | 19.6 | 6.0 | 14.4 | 5.8 |
| 600 | 18.4 |  | 15.8 |  |
| (II) Over Aluminum Wire: |  |  |  |  |
| 0 | 14.5 | 0.3 | 14.8 | 0.3 |
| 4 | 15.6 | 1.8 | 16.0 | 1.7 |
| 8 | 16.5 | 2.8 | 16.8 | 2.7 |
| 16 | 17.0 | 4.2 | 16.2 | 3.4 |
| 24 | 16.8 | 4.5 | 15.4 | 4.0 |
| 30 | 16.6 | 4.8 | 12.8 | 4.6 |
| 48 | 13.5 | 5.5 | 11.8 | 5.0 |
| 60 | 12.8 | 5.4 | 12.2 | 5.2 |
| 72 | 11.0 | 5.8 | 8.5 | 5.6 |
| 80 | 13.7 | 6.0 | 14.4 | 5.4 |
| 96 | 14.0 | 6.6 | 15.0 | 6.4 |
| 144 | 11.8 | 4.2 | 11.4 | 4.7 |
| 192 | 13.0 | 4.6 | 10.0 | 5.2 |
| 240 | 14.5 | 5.1 | 13.5 | 5.3 |
| 262 | 13.6 | 5.1 | 12.8 | 5.3 |
| 340 | 13.2 | 5.2 | 9.4 | 4.2 |
| 435 | 12.0 | 5.0 | 12.2 | 4.6 |
| 460 | 13.0 | 5.3 | 11.5 | 4.6 |
| 500 | 13.5 | 5.5 | 9.7 | 4.6 |

Tests based on the revised Curved Electrode Test Method using 4 mil heat cleaned glass cloth No. 116 were conducted according to ASTM D-1932-61T and MIL 1137 revised. The glass cloth panels are double dipped in the insulating varnish and baked two hours at 325° F. and then aged at various temperatures in order to plot a thermal endurance life cure. The end-point is based on a dielectric failure of 300 v. per mil.

Results at 250° C. were as follows:

Hours
(1) Best commercially available non-isocyanurate-containing polyester varnish (Ex. 11) _____ 230
(2) Varnish of Ex. 9 employing the polyester of Ex. 4 _____ 550

The following example is presented to illustrate a preferred embodiment of this invention:

*Example 12*

A wire, enameled with the composition of Example 15 of S.N. 312,320, is employed to prepare an armature. This armature is then varnished with the composition of Example 9 of this application containing the polyester of Example 4 and cured to yield a class H product.

Although the utility of the oil-modified polyester resins of our invention has been described principally in terms of electrical applications, it should be understood that these resins may be used in all of the other applications suitable for synthetic resins. Thus, these resins can be employed in protective coating applications by applying the resin in a suitable solvent to a surface by brushing or spraying with subsequent curing. When used as a protective coating, these resins have outstanding resistance to weathering and do not discolor after extended exposure to elevated temperatures. These resins can also be employed in protective coating applications by applying the resin in a suitable solvent to a surface by brushing or spraying with subsequent curing. These resins can also be employed in varnish and paint formulations. These resins can also be used in molding powder formulations by mixing them with various fillers such as wood flour, diatomaceous earth, carbon, silica, etc. These resins are also useful as impregnants and as bonding materials for metallic and fibrous laminates. They are useful as coatings for tapes, glass cloth, fabrics, paper, as mica binders, as asbestos binders, as electrical tubing and sleaving varnishes, as a laminating varnish, etc.

In addition to the use of phenol-aldehyde resins the polyester resins of the present invention may be mixed and cured with other resins such as melamine-formaldehyde resins, epoxide resins such as the reaction product of epichlorohydrin and bis-phenol-A, aniline-formaldehyde resins, urea-formaldehyde resins, silicone resins, cellulose acetate resins, polyamide resins, vinyl resins, ethylene resins, styrene resins, butadiene-styrene resins, etc., or any of the other resins specified herein.

Many different embodiments of this invention can be made without departing from the spirit and scope thereof. All of the teachings of the present invention in conjunction with the teachings of S.N. 312,320 can be employed in carrying out the present invention.

For example, any of the polycarboxylic acids, glycols, polyols, processes, uses, methods of preparation, ratios, etc., described therein can be employed in the present invention, and S.N. 312,320 is by reference incorporated into the present application.

Having thus described our invention what we claim as new and desire to obtain by Letters Patent is:

1. An oil-modified polyester reaction product derived from
   (I) a polyfunctional derivative of an isocyanuric acid selected from the group consisting of
   (1)

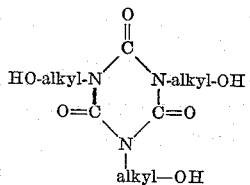

and
   (2)

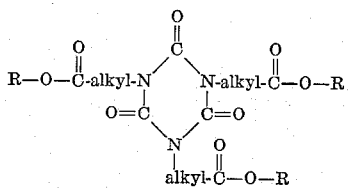

where R is hydrogen or the hydrocarbon-containing moiety of an alcohol,
   (II) a member of the group consisting of (1) polycarboxylic acids and esters thereof, (2) glycols, (3) polyols, and (4) mixtures thereof, and
   (III) a member selected from the group consisting of (1) fatty acids, (2) fatty oils, and (3) mixtures of (1) and (2).

2. The oil-modified polyester reaction product of claim 1 wherein the polyfunctional derivative of an isocyanuric acid is

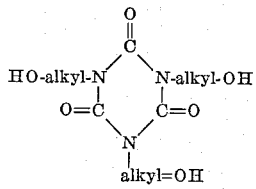

3. The oil-modified polyester reaction product of claim 1 wherein the polyfunctional derivative of an isocyanuric acid is

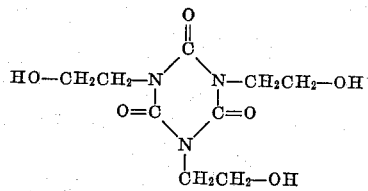

4. An oil-modified polyester reaction product derived from
   (I)

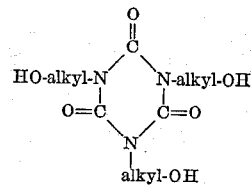

(II) a polycarboxylic acid, and
   (III) a fatty acid.

5. The oil-modified polyester reaction product of claim 4 wherein (I) is tris(hydroxyethyl) isocyanurate and (II) is a phthalic acid selected from the group consisting of isophthalic acid and terephthalic acid.

6. An oil-modified polyester reaction product of
   (I)

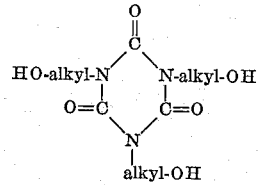

(II) a polycarboxylic acid, and
   (III) a fatty oil.

7. The oil-modified polyester reaction product of claim 6 wherein (I) is tris(hydroxyethyl) isocyanurate and (II) is a phthalic acid selected from the group consisting of isophthalic acid terephthalic acid.

8. An electric conductor insulating varnish composition comprising the oil-modified polyester reaction product of claim 1 further modified with a phenol-aldehyde resin.

9. An electrical conductor insulating varnish composition comprising the oil-modified polyester reaction product of claim 2 further modified with a phenol-aldehyde resin.

10. An electrical conductor insulating varnish composition comprising the oil-modified polyester reaction product of claim 3 further modified with a phenol-aldehyde resin.

11. An electrical conductor insulating varnish composition comprising the oil-modified polyester reaction product of claim 4 further modified with a phenol-aldehyde resin.

12. An electrical conductor insulating varnish composition comprising the oil-modified polyester reaction product of claim 5 further modified with a phenol-aldehyde resin.

13. An electrical conductor insulating varnish composition comprising the oil-modified polyester reaction product of claim 6 further modified with a phenol-aldehyde resin.

14. An electrical conductor insulating varnish composition comprising the oil-modified polyester reaction product of claim 7 further modified with a phenol-aldehyde resin.

15. An electrical conductor coated with
(A) a polyester reaction product derived from
   (I) a polyfunctional derivative of an isocyanuric acid selected from the group consisting of
   (1)

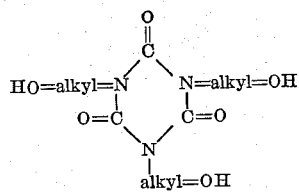

and
   (2)

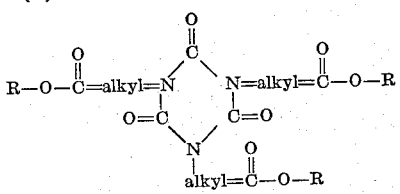

where R is hydrogen or the hydrocarbon-containing moiety of an alcohol, and
   (II) a member of the group consisting of (1) polycarboxylic acids and esters thereof, (2) glycols, (3) polyols, and (4) mixtures thereof, and
(B) the varnish composition of claim 8.

16. An electrical conductor coated with the cured composition of claim 8.
17. An electrical conductor coated with the cured composition of claim 9.
18. An electrical conductor coated with the cured composition of claim 10.
19. An electrical conductor coated with the cured composition of claim 11.
20. An electrical conductor coated with the cured composition of claim 12.
21. An electrical conductor coated with the cured composition of claim 13.
22. An electrical conductor coated with the cured composition of claim 14.

References Cited by the Examiner

UNITED STATES PATENTS

| | | | |
|---|---|---|---|
| 1,098,728 | 6/1914 | Howell | 260—22 |
| 2,957,837 | 10/1960 | Smith et al. | 260—22 |
| 3,108,083 | 10/1963 | Laganis | 260—22 |
| 3,133,032 | 5/1964 | Jen et al. | 260—22 |
| 3,174,950 | 3/1965 | Cordier | 260—248 |
| 3,211,585 | 10/1965 | Meyer et al. | 260—248 |
| 3,215,758 | 11/1965 | Hopkins | 260—868 |

LEON J. BERCOVITZ, *Primary Examiner.*

DONALD E. CZAJA, *Examiner.*

R. W. GRIFFIN, *Assistant Examiner.*